(12) United States Patent
Liao

(10) Patent No.: US 11,633,035 B2
(45) Date of Patent: Apr. 25, 2023

(54) MAKEUP MIRROR DISPLAY WITH MULTIPLE CAMERAS AND VARIABLE COLOR TEMPERATURE LIGHT SOURCE

(71) Applicant: Chien-Chih Liao, Taipei (TW)

(72) Inventor: Chien-Chih Liao, Taipei (TW)

(*) Notice: Subject to any disclaimer, the term of this patent is extended or adjusted under 35 U.S.C. 154(b) by 0 days.

(21) Appl. No.: 17/518,574

(22) Filed: Nov. 3, 2021

(65) Prior Publication Data

US 2022/0218091 A1    Jul. 14, 2022

(30) Foreign Application Priority Data

Jan. 14, 2021   (TW) ................................ 110200469

(51) Int. Cl.
| | | |
|---|---|---|
| *A45D 44/00* | (2006.01) | |
| *H04N 5/262* | (2006.01) | |
| *G06F 1/16* | (2006.01) | |
| *H05B 45/20* | (2020.01) | |
| *H05B 45/3577* | (2020.01) | |
| *F21V 33/00* | (2006.01) | |
| *F21Y 115/10* | (2016.01) | |
| *H04N 5/272* | (2006.01) | |

(52) U.S. Cl.
CPC .......... *A45D 44/005* (2013.01); *F21V 33/004* (2013.01); *G06F 1/1607* (2013.01); *H04N 5/2621* (2013.01); *H05B 45/20* (2020.01); *H05B 45/3577* (2020.01); *F21Y 2115/10* (2016.08); *H04N 2005/2726* (2013.01)

(58) Field of Classification Search
CPC .. A45D 44/005; H04B 45/20; H04B 45/3577; F21V 33/004; G06F 1/1607; H04N 5/2621
See application file for complete search history.

(56) References Cited

U.S. PATENT DOCUMENTS

| | | | | |
|---|---|---|---|---|
| 2010/0296298 A1* | 11/2010 | Martin, Jr. | ................ | A47G 1/02 362/311.06 |
| 2015/0159856 A1* | 6/2015 | Adachi | ............... | F21V 33/0056 362/135 |
| 2020/0050347 A1* | 2/2020 | Yong | .................... | G06F 3/04847 |
| 2020/0128195 A1* | 4/2020 | Yong | .................... | G06V 40/166 |
| 2020/0336705 A1* | 10/2020 | Mouizina | .............. | H05B 47/11 |
| 2021/0358181 A1* | 11/2021 | Suzuki | ................... | H04N 21/41 |
| 2021/0361088 A1* | 11/2021 | Shin | ........................ | G06F 3/167 |
| 2021/0361089 A1* | 11/2021 | Shin | ........................ | G06F 3/14 |
| 2022/0086991 A1* | 3/2022 | Park | ..................... | G06V 10/141 |

* cited by examiner

*Primary Examiner* — Bryon T Gyllstrom
(74) *Attorney, Agent, or Firm* — Che-Yang Chen; Law Office of Michael Chen

(57) ABSTRACT

A makeup mirror display with multiple cameras and variable color temperature light source includes an adjustable makeup mirror, a makeup mirror display, at least two cameras, and at least one variable color temperature light source. The makeup mirror display is arranged at one end of the adjustable makeup mirror surface and includes at least one control button and a control circuit arranged therein. The at least two cameras are respectively arranged on a left side and a right side of the makeup mirror display and electrically connected with the makeup mirror display. The at least one variable color temperature light source is disposed on one side of the makeup mirror display and electrically connected with the makeup mirror display. Therefore, the user can perform makeup more efficiently and finish a more perfect makeup, so as to enhance the overall practicability and convenience.

17 Claims, 2 Drawing Sheets

MAKEUP MIRROR DISPLAY WITH MULTIPLE CAMERAS AND VARIABLE COLOR TEMPERATURE LIGHT SOURCE

BACKGROUND OF THE PRESENT INVENTION

Field of Invention

The present invention relates to a technology of a makeup mirror display, and more particularly to a makeup mirror display equipped with a plurality of cameras and a plurality of variable color temperature light sources for ensuring the user to have a more efficient makeup and a perfect makeup without blind angles, so as to improve the overall practicability and convenience of the makeup mirror display.

Description of Related Arts

Beauty is a human nature. Grooming and wearing a proper makeup not only please oneself, but also show respect to others. Different occasions suit different makeups, so there are a wide variety of cosmetics and cosmetic tools with various kinds of functions on the market.

People who make up regularly would know that regular makeup mirror can only clearly reflect if the makeup of the front face has done well, but it cannot clearly reflect whether there is a defect behind many subtle parts or sides of the face, or when there is a large difference between the indoor lighting and the outdoor lighting. A perfect makeup cannot be presented due to overly thick or thin makeups, which sometimes renders scary makeup, so that a perfect makeup with no blind spot and no chromatic aberration cannot be achieved by using a regular makeup mirror.

Therefore, there is a demand to the present invention to provide a makeup mirror display with multiple cameras and variable color temperature light source which is capable of allowing the user to make up more efficiently and to come up with a perfect makeup without blind spot, so as to improve the overall practicability and convenience thereof, that would be disclosed in the present invention.

SUMMARY OF THE PRESENT INVENTION

An object of the present invention is to provide a makeup mirror display with multiple cameras and variable color temperature light source, which is configured to provide at least two cameras and at least one variable color temperature light source, for allowing the user to clearly see the makeup on each position of his/her face during make up, and showing the makeup on the makeup mirror display as well as simulating indoor yellow light and outdoor white light for ensuring the makeup being more perfect through avoiding chromatic aberration, so as to enhance the efficiency and practicability of making up.

In order to achieve the above and other objects, the present invention provides a makeup mirror display with multiple cameras and variable color temperature light source, comprising: an adjustable makeup mirror, a makeup mirror display, at least two cameras, and at least one variable color temperature light source. The makeup mirror display is a touch panel arranged at one end of the adjustable makeup mirror and has at least one control button and a control circuit arranged therein. The at least two cameras are respectively arranged at a left side and a right side of the makeup mirror display and electrically connected with the makeup mirror display. The at least one variable color temperature light source is disposed on one side of the makeup mirror display and is electrically connected with the makeup mirror display.

According to a preferred embodiment, the makeup mirror display is arranged on an upper end of the adjustable makeup mirror. The cameras are respectively mounted at a left side member and a right side member of an adjustable bracket, and the at least one variable color temperature light source is mounted to the adjustable bracket, wherein at least one of the left and right side members of the adjustable bracket is arranged in relative to a position of the makeup mirror display to be movable in position, changeable in angle or foldable to be behind the makeup mirror display. The present invention further comprises an AI (Artificial Intelligence) smart module, disposed in the makeup mirror display, capable of applying various makeups or colors of celebrities onto the user's face, so as for assisting, guiding, and providing references for the user's making up. The variable color temperature light source is preferably a variable color temperature LED with color temperature range between 3000K (indoor yellow light) and 6000K (outdoor white light).

In order to achieve the above and other objects, the present invention also provides a makeup mirror display with multiple cameras and variable color temperature light source, comprising: an adjustable makeup mirror, at least two cameras, and at least one variable color temperature light source. The adjustable makeup mirror comprises an embedded display unit, at least a control button and a control circuit arranged therein. The at least two cameras are respectively arranged at a left side and a right side of the adjustable makeup mirror and electrically connected with the control circuit of the adjustable makeup mirror. The least one variable color temperature light source is arranged at a side of the adjustable makeup mirror and electrically connected the control circuit of the adjustable makeup mirror surface.

According to another preferable embodiment, the embedded display unit is arranged in the adjustable makeup mirror at an upper half portion thereof. The left side and right side cameras are respectively arranged on a left side adjustable bracket and a right side adjustable bracket, and the at least one variable color temperature light source is arranged on one of the left and right side adjustable brackets, wherein each of the left side and right side adjustable brackets is configured in relative to a position of the adjustable makeup mirror to be movable in position, changeable in angle, and foldable to be behind the adjustable makeup mirror. The present invention further comprises an AI (Artificial Intelligence) smart module, disposed in the adjustable makeup mirror, which is capable of applying various makeups or colors of the celebrities onto the user's face, so as for assisting, guiding, and providing references for the user's making up. The variable color temperature light source is preferably a variable color temperature LED with color temperature range between 3000K and 6000K.

DETAILED DESCRIPTION OF THE PREFERRED EMBODIMENT

Other advantages and efficacy of the present invention will be readily apparent to those skilled in the art from the following specific and detailed description of embodiments of the present invention.

The embodiments of the present invention will be illustrated below with the figures, and it should be noted that the figures are merely illustrative of the principles of the present invention and are merely illustrative of the principles of the present invention and are not drawn to the exact quantities, shapes, and sizes of the elements. The forms, quantities, and rations of the elements in actual implementations of the present invention shall not be limited by the figures, but to meet the actual needs instead. Besides, in order to simplify the figures, some commonly known structures and elements in the figures are illustrated in simple and illustrative manner and repeating elements may be represented with same number.

Figure 1:
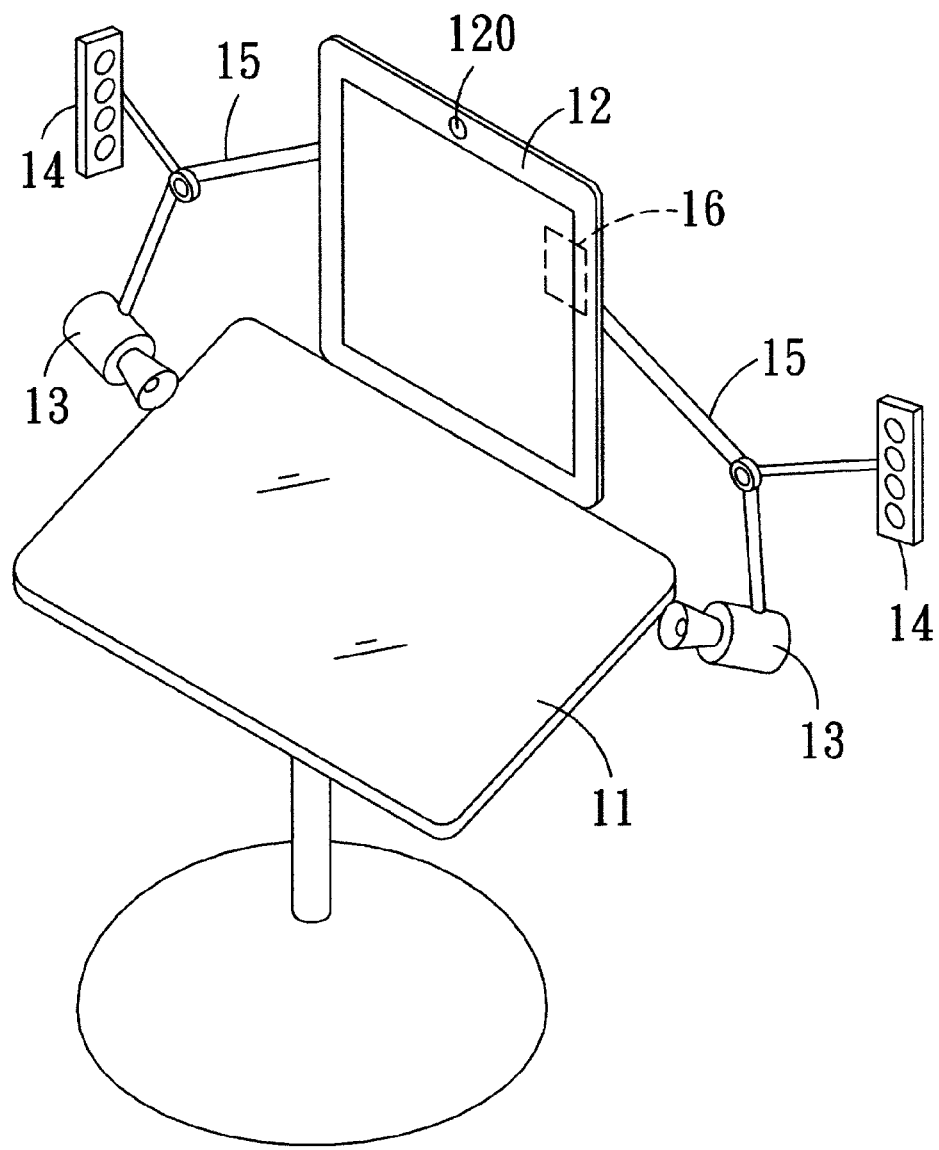
FIG. 1 is a perspective view of a makeup mirror display with multiple cameras and variable color temperature light source according to a first preferred embodiment of the present invention.

Referring to FIG. 1, a perspective view of a makeup mirror display with multiple cameras and variable color temperature light source according to a first preferred embodiment of the present invention is illustrated. As shown in the figure, the present invention provides a makeup mirror display 1 with multiple cameras and variable color temperature light source, comprising an adjustable makeup mirror 11, a makeup mirror display 12, at least two cameras 13, and at least two variable color temperature light sources 14. The makeup mirror display 12 which is embodied as a touch panel structure is arranged at an upper end of the adjustable makeup mirror 11 and comprises at least a control button 120 and a control circuit arranged therein. The at least two cameras 13 are arranged at a left side and a right side of the adjustable makeup mirror 11 and/or makeup mirror display 12 respectively and electrically connected with the makeup mirror display 12. The at least two variable color temperature light sources 14 are disposed at the left side and the right side of the makeup mirror display 12 respectively and electrically connected with the makeup mirror display 12.

According to the above first preferred embodiment, the left side and right side cameras 13 and the left side and right side variable color temperature light sources 14 are respectively arranged on a left side member and a right side member of an adjustable bracket 15, wherein each of the left side member and the right side member of the adjustable bracket 15 is configured in relative to a position of makeup mirror display 12 to be movable in position, changeable in angle, and foldable to be behind the makeup mirror display 12. The makeup mirror display 1 further comprises an AI (Artificial Intelligence) smart module 16 equipped in the makeup mirror display 12 and being capable of applying various makeups or colors of the celebrities onto the user's face, so as for assisting, guiding, and providing references for the user's making up. Each of the variable color temperature light source 14 is preferably embodied as a variable color temperature LED with color temperature range between 3000K (indoor yellow light) and 6000K (outdoor white light).

According to the above disclosed structure, in actual use, the user is not only capable of doing makeup through the adjustable makeup mirror 11, but also capable of doing makeup through the aids of the variable color temperature light sources 14 and the cameras 13 arranged at both sides of the adjustable makeup mirror 11 respectively and shooting the user's make up in various angles and different positions through the at least two cameras 13 while the variable color temperature light sources 14 providing an environment of various color temperatures for the user to do the makeup or different simulate color temperatures (yellow light for the indoor or white light for the outdoor), so as to facilitate the user to make up. In addition, various makeups and difference colors of celebrities are able to be applied onto the user's face through the AI smart module 16, which may as well assist, guide, and provide references for the user's making up.

Figure 2:
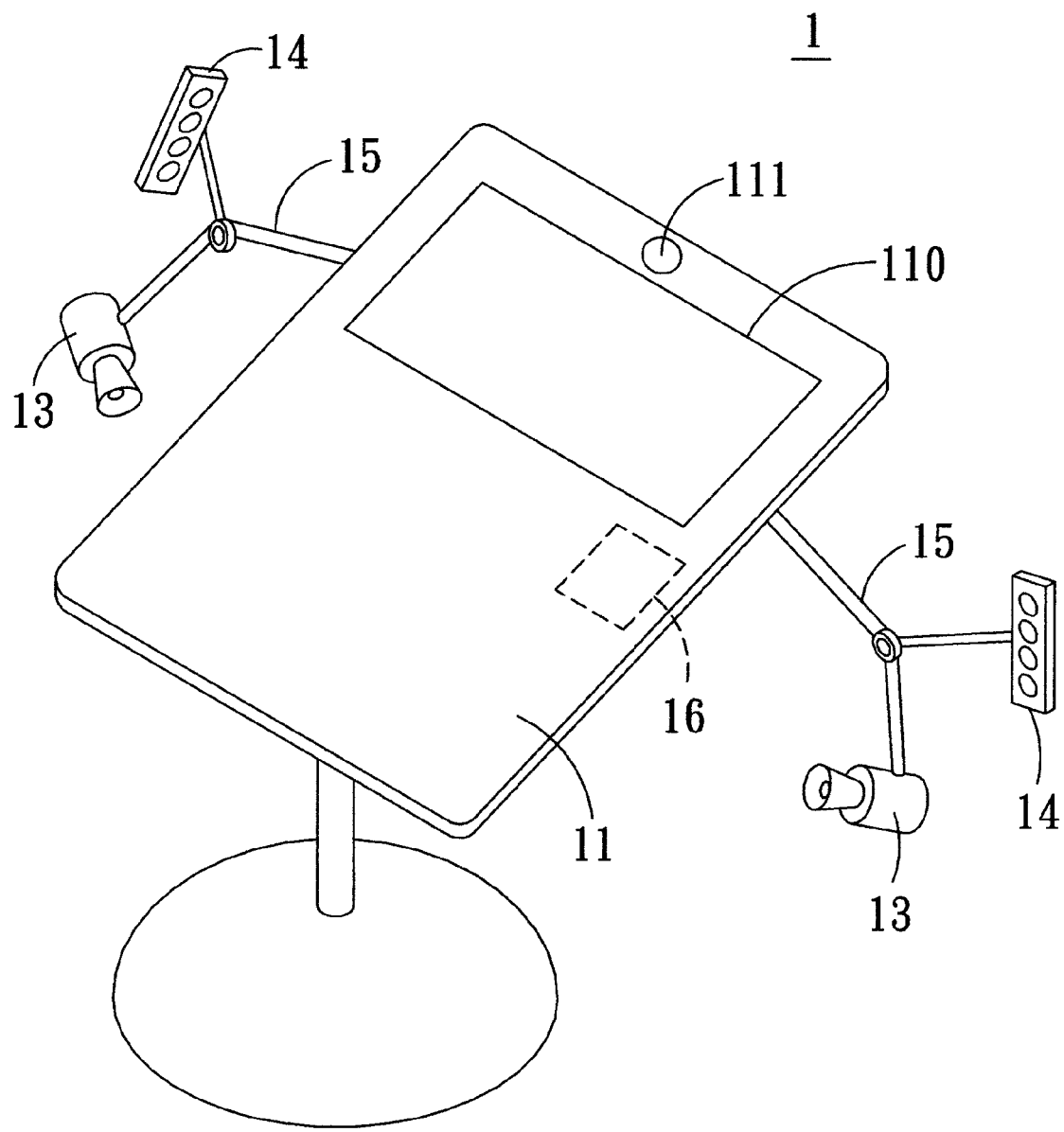
FIG. 2 is a perspective view of a makeup mirror display with multiple cameras and variable color temperature light source according to a second preferred embodiment of the present invention.

Further, referring to FIG. 2, a perspective view of a makeup mirror display of multiple cameras and variable color temperature light source according to a second preferred embodiment of the present invention is illustrated. As shown in the figure, according to the second preferred embodiment, the present invention provides a makeup mirror display 1 with multiple cameras and variable color temperature light source, comprising: an adjustable makeup mirror 11, at least two cameras 13 and at least two variable color temperature light sources 14. The adjustable makeup mirror 11 comprises an embedded display unit 110, at least a control button 111, and a control circuit arranged therein. The at least two cameras 13 are arranged at a left side and a right side of the adjustable makeup mirror 11 respectively and electrically connected with the control circuit in the adjustable makeup mirror surface. The at least two variable color temperature light sources are arranged on the left side and right side of the adjustable makeup mirror 11 respectively and electrically connected the control circuit in the adjustable makeup mirror surface 11.

According to the above second preferred embodiment, the embedded display 110 is arranged in the adjustable makeup mirror 11 at an upper half portion thereof. The at least two cameras 13 and the at least two variable color temperature light sources 14 are arranged on a left side adjustable bracket 15 and a right side adjustable bracket 15 respectively, wherein each of the left side and right side adjustable brackets 15 is configured in relative to a position of adjustable makeup mirror surface 11 to be movable in position, changeable in angle, and foldable to be behind the adjustable makeup mirror 11. The makeup mirror display 1 further comprises an AI (Artificial Intelligence) smart module 16 which is disposed in the adjustable makeup mirror 16 and capable of applying various makeups or colors of the celebrities onto the user's face, so as for assisting, guiding, and providing references for the user making up. Each of the least two variable color temperature light sources 14 is preferably embodied as a variable color temperature LED with color temperature range between 3000K and 6000K.

According to the above disclosed structure, in actual use, similar with the above first preferred embodiment, the user is not only capable of doing makeup through the adjustable makeup mirror surface 11, but also capable of doing makeup through the aids of the left side and right side variable color temperature light sources 14 and the left side and right side cameras 13 and shooting the user's make up in various angles and different positions through the at least two cameras 13 while the at least two variable color temperature light sources 14 providing an environment of various color temperatures for the user to do the makeup or different simulate color temperatures (yellow light for the indoor or white light for the outdoor), so as to facilitate the user to make up. In addition, various makeups and different colors of celebrities are able to be applied on the user's face through the AI smart module 16, which may as well assist, guide, and provide references for the user making up.

Contrasting to the prior art, the makeup mirror display with multiple cameras and variable color temperature light source of the present invention mainly utilizes multiple cameras and one or more variable color temperature light sources to assist the user to perform makeup with no blind spot and no chromatic aberration, which can increase the efficiency of making up, perfect the makeup result, and enhance the overall practicability and convenience.

While the foregoing description and drawings have disclosed preferred embodiments of the present invention, it should be understood that various additions, modifications, and substitutions may be made to the preferred embodiments of the present invention without departing from the spirit and scope of the principles of the present invention as defined by the appended claims. One of ordinary skill in the art to which this disclosure pertains will appreciate that the present invention may be utilized with modifications in many forms, structures, arrangements, proportions, materials, elements, and components. Accordingly, the embodiments disclosed herein shall be considered as illustrative and not restrictive of the present invention. The scope of the present invention should be defined by the appended claims, and be intended to cover legal equivalents thereof, and not be limited to the previous description.

What is claimed is:

1. A makeup mirror display, comprising:
   a makeup mirror;
   a makeup mirror display, equipped with said adjustable makeup mirror, comprising at least a control button and a control circuit arranged in said makeup mirror display;
   at least two cameras respectively arranged on a left side and a right side of said makeup mirror and electrically connected with said makeup mirror display;
   at least one variable color temperature light source arranged at one side of said makeup mirror and electrically connected with said makeup mirror display; and
   an adjustable bracket comprising a left side member and a right side member, wherein said at least two cameras are arranged on said left side member and said right side member of said adjustable bracket respectively and said at least one variable color temperature light source is arranged on one of said left side member and said right side member of said adjustable bracket, wherein each of said left side member and said right side member of said adjustable bracket is configured in relative to a position of said makeup mirror to be movable in position, changeable in angle and foldable.

2. The makeup mirror display, as recited in claim 1, wherein said at least one variable color temperature light source has a color temperature range between 3000K and 6000K.

3. The makeup mirror display, as recited in claim 2, further comprising an Al smart module equipped in said makeup mirror display and configured for applying various makeups or colors of celebrities onto a face of a user.

4. The makeup mirror display, as recited in claim 3, wherein said makeup mirror is embedded in said makeup mirror and said adjustable bracket is configured to be folded behind said makeup mirror.

5. The makeup mirror display, as recited in claim 3, wherein said makeup mirror display is arranged at an upper end of said makeup mirror and said left side member and said right side member of said adjustable bracket are disposed at a left side a said right side of said makeup mirror display respectively, wherein each of said left side member and said right side member of said adjustable bracket is configured to be folded behind said makeup mirror display.

6. The makeup mirror display, as recited in claim 2, wherein said makeup mirror is embedded in said makeup mirror and said adjustable bracket is configured to be folded behind said makeup mirror.

7. The makeup mirror display, as recited in claim 2, wherein said makeup mirror display is arranged at an upper end of said makeup mirror and said left side member and said right side member of said adjustable bracket are disposed at a left side a said right side of said makeup mirror display respectively, wherein each of said left side member and said right side member of said adjustable bracket is configured to be folded behind said makeup mirror display.

8. The makeup mirror display, as recited in claim 1, further comprising an Al smart module equipped in said makeup mirror display and configured for applying various makeups or colors of celebrities onto a face of a user.

9. The makeup mirror display, as recited in claim 1, wherein said makeup mirror is embedded in said makeup mirror and said adjustable bracket is configured to be folded behind said makeup mirror.

10. The makeup mirror display, as recited in claim 1, wherein said makeup mirror display is arranged at an upper end of said makeup mirror and said left side member and said right side member of said adjustable bracket are disposed at a left side a said right side of said makeup mirror display respectively, wherein each of said left side member and said right side member of said adjustable bracket is configured to be folded behind said makeup mirror display.

11. A makeup mirror display, comprising:
    a makeup mirror;
    a makeup mirror display, equipped with said adjustable makeup mirror, comprising at least a control button and a control circuit arranged in said makeup mirror display;
    at least two cameras respectively arranged on a left side and a right side of said makeup mirror and electrically connected with said makeup mirror display;
    at least one variable color temperature light source arranged at one side of said makeup mirror and electrically connected with said makeup mirror display; and
    an Al smart module equipped in said makeup mirror display and configured for applying various makeups or colors of celebrities onto a face of a user.

12. A makeup mirror display, comprising:
    a makeup mirror;
    a makeup mirror display, equipped with said adjustable makeup mirror, comprising at least a control button and a control circuit arranged in said makeup mirror display;
    at least two cameras respectively arranged on a left side and a right side of said makeup mirror and electrically connected with said makeup mirror display;
    at least one variable color temperature light source arranged at one side of said makeup mirror and electrically connected with said makeup mirror display, wherein said makeup mirror display is arranged at an upper end of said makeup mirror; and
    a left side adjustable bracket and a right side adjustable bracket arranged at a left side and a right side of said makeup mirror display respectively, wherein said at least two cameras are arranged on said left side adjustable bracket and said right side adjustable bracket respectively and said at least one variable color temperature light source is arranged on one of said left side adjustable bracket and said right side adjustable bracket, wherein each of said left side adjustable bracket and said right side adjustable bracket is configured in relative to a position of said makeup mirror to be movable in position, changeable in angle, and foldable to be behind said makeup mirror display.

13. The makeup mirror display, as recited in claim 12, wherein said at least one variable color temperature light source has a color temperature range between 3000K and 6000K.

14. The makeup mirror display, as recited in claim 13, further comprising an Al smart module equipped in said makeup mirror display and configured for applying various makeups or colors of celebrities onto a face of a user.

15. The makeup mirror display, as recited in claim 12, further comprising an Al smart module equipped in said makeup mirror display and configured for applying various makeups or colors of celebrities onto a face of a user.

16. A makeup mirror display, comprising:
    a makeup mirror;
    a makeup mirror display, equipped with said adjustable makeup mirror, comprising at least a control button and a control circuit arranged in said makeup mirror display;
    at least two cameras respectively arranged on a left side and a right side of said makeup mirror and electrically connected with said makeup mirror display; and
    at least one variable color temperature light source arranged at one side of said makeup mirror and electrically connected with said makeup mirror display, wherein said makeup mirror display is arranged at an upper end of said makeup mirror, wherein said at least one variable color temperature light source has a color temperature range between 3000K and 6000K.

17. A makeup mirror display, comprising:
    a makeup mirror;
    a makeup mirror display, equipped with said adjustable makeup mirror, comprising at least a control button and a control circuit arranged in said makeup mirror display;
    at least two cameras respectively arranged on a left side and a right side of said makeup mirror and electrically connected with said makeup mirror display; and
    at least one variable color temperature light source arranged at one side of said makeup mirror and electrically connected with said makeup mirror display, wherein said at least one variable color temperature light source comprises a variable color temperature LED light.

* * * * *